United States Patent [19]
Yasukawa

[11] Patent Number: 5,692,118
[45] Date of Patent: Nov. 25, 1997

[54] AUTOFOCUS CONTROL DEVICE HAVING MOVING BODY TRACKING CONTROL

[75] Inventor: Seiichi Yasukawa, Yotsukaido, Japan

[73] Assignee: Nikon Corporation, Tokyo, Japan

[21] Appl. No.: 524,577

[22] Filed: Sep. 7, 1995

[30] Foreign Application Priority Data

Nov. 2, 1994 [JP] Japan .................... 6-269302

[51] Int. Cl.[6] .................... G03B 3/00; G03B 13/18; G03B 7/08
[52] U.S. Cl. .................... 396/153; 396/154
[58] Field of Search .................... 354/402, 430, 354/432, 400; 396/153, 154

[56] References Cited

U.S. PATENT DOCUMENTS

| | | | |
|---|---|---|---|
| 4,783,677 | 11/1988 | Hamada et al. | 354/402 |
| 4,924,250 | 5/1990 | Hamada et al. | 354/402 |
| 5,179,407 | 1/1993 | Kusaka et al. | 354/402 |
| 5,208,625 | 5/1993 | Suekane | 354/402 |
| 5,239,332 | 8/1993 | Muramatsu et al. | 354/402 |
| 5,270,763 | 12/1993 | Ogasawara | 354/402 |
| 5,424,776 | 6/1995 | Hirasawa | 354/402 |
| 5,448,051 | 9/1995 | Yamano | 354/402 |
| 5,448,329 | 9/1995 | Nakata | 354/402 |
| 5,502,537 | 3/1996 | Utagawa | 354/402 |

*Primary Examiner*—Safet Metjahic
*Assistant Examiner*—Michael Dalakis

[57] ABSTRACT

An autofocus control device to perform lens drive control with moving body tracking control. The autofocus control device includes a defocus amount computation device to determine a defocus amount representing an amount of deviation in the optical axis direction of an image formed by the lens and an image forming plane. A drive position computation device computes a position to which the photographic lens is to be driven based upon the defocus amount. A first drive direction computation device and a second drive direction computation device both determine a direction in which the lens is to be driven based upon different information. A field travel speed computation device computes a field travel speed for the subject based upon computed drive positions for the photographic lens. A moving body determination device determines whether the subject is a moving body when the drive directions determined by the first and second drive direction computation devices are the same, and the field travel speed determined by the field travel speed computation device is greater than a predetermined value. When the moving body determination device determines that the subject is a moving body, the photographic lens is driven at a speed computed according to lens drive positions computed by the drive position computation device.

16 Claims, 10 Drawing Sheets

AUTOFOCUS CONTROL DEVICE HAVING MOVING BODY TRACKING CONTROL

BACKGROUND OF THE INVENTION

1. Field of the Invention

The present invention relates to an autofocus control device suitable for use in a photographic device such as a camera, and, more particularly, the present invention relates to an autofocus control device having moving body tracking control which eliminates error factors.

2. Description of the Related Art

Photographic devices, such as cameras, are known which include an autofocus device having an autofocus control device. The autofocus control device generally includes a photoelectric conversion device, such as a CCD sensor, positioned at a point in the camera after entering light rays have passed through a photographic optical system for capturing the image of a subject or another focus detection optical system. The photoelectric conversion device converts the image into analog signals representing the image. A microcomputer then performs A/D conversion of the analog signals representing the image captured by the focus detection optical system and focus detection computation processing to compute an amount of dislocation (hereinafter referred to as "the defocus amount") between a focal plane resolved by a photographic lens and the image-forming plane of the film. A drive system including an electromotive actuator, such as a motor, connected to a mechanical means for shifting the photographic lens in an optical axis direction, drives the photographic lens to match the position of the image-forming plane with the focal plane. By adjusting the drive amount of the electromotive actuator under the control of the microcomputer, the photographic lens is controlled to move to a specified position. The above-described defocus amount detection system and drive system are linked and the microcomputer controls the operation of adjusting the position of the photographic lens using the drive system so that the amount of defocus detected by the defocus amount detection system is zero (0).

A problem arising recently in connection with camera focusing technology has been how to perform "moving body tracking control", in which the focal point of a subject travelling in an optical axis direction at the instant the subject is photographed is aligned on the focal plane. The basic operations involved in moving body tracking control are described below. Preliminary to when shutter release is performed, the defocus amount is repeatedly computed by the defocus amount detection system, and the computed defocus amounts are stored as a time series of defocus amounts. A field travel speed which accompanies subject movement is computed by storing information related to at least the previous two defocus amounts generated by the detection system. A straight line representing the progression of a target lens position over time is estimated from the current lens position and the information related to at least the previous two defocus amounts. The actuator is then driven under control of the microcomputer so that the respective lens positions at the various times match the estimated straight line representing the progression of target lens position.

In certain types of cameras, such as a single lens reflex camera, the incidence of the photographic luminous flux into the focus detection system disappears in conjunction with the raising of a mirror when shutter release has been performed. Accordingly, the driving of the actuator is controlled so that the actual lens position at the instant of exposure through shutter opening is matched with a target lens position obtained according to the target lens position estimated straight line obtained through a previous detection immediately before shutter release.

The following types of systems are typical of conventional systems having an autofocus mechanism which includes the above-described type of moving body tracking control. First, a "moving body determination" is performed, wherein a determination is made whether or not the subject is clearly a moving subject, by comparing the field travel speed computed in the above-described manner with a specified threshold value. When the moving body determination judges that the subject is not a moving body, lens position control to a fixed target position is performed. When the moving body determination judges that the subject is a moving body, lens position and speed control is performed during which the target speed is added to the moving target position.

The above-described moving body determination is performed in advance such that an error component, which may arise due to errors in the defocus amount detection system, may be eliminated. Specifically, the defocus amount computed by the microcomputer based on the subject image detected by the photoelectric conversion device may contain error due to various factors, such as the noise of the photoelectric conversion device, the resolving power of the A/D converter, and the processing capability of the microcomputer to perform the focus detection computation. The field travel speed, computed based on information which includes the types of error factors noted above, will include a certain range of dispersion with respect to the true subject field travel speed.

The dispersion of the target field travel speeds results in the problem of the lens moving erratically. Specifically, if moving body tracking control is normally performed in response to a computed field travel speed, which is a continuous value including zero (0), without performing a moving body determination, even when the true subject is stationary, the dispersion of the target field travel speeds resulting from the detection error is responded to, resulting in the problem of the lens moving erratically. For this reason, the computed field travel speed is judged at a certain threshold value, and moving body determination processing to eliminate the component which may possibly arise from detection error is necessary.

The following problems also arise in performing the moving body determination. Specifically, when the threshold value of the field travel speed at which a subject is judged to be a moving body does not exceed the maximum visually perceived field travel speed generated by the detection error, moving body misinterpretation is not eliminated.

FIG. 11 is a graph showing a required drive position P(M) with respect to time T, with time T shown on the horizontal axis and the required drive position of the lens P(M) shown on the vertical axis. The times T(0)~T(7) on the horizontal axis indicate each of the times defocus amount detection was performed, from the most recent time defocus amount detection was performed T(0), back to T(7), the seventh previous time defocus amount detection was performed. The black dots in FIG. 11 indicate the required drive positions P(0)~P(7) obtained at each time T(0)~T(7), respectively. The heights of the black dots P(0)~P(7) are dispersed, due to the detection error, throughout a range whose upper limit is PU and whose lower limit is PL with respect to the true position PR. For example, with P(0) computed as the upper limit of the range, and P(3) computed as the lower limit of the range, if the target speed is computed from the difference between the most recent defocus amount and the third previous defocus amount, a speed which is larger than the slope of a straight line PT which connects P(0) and P(3) must be made the threshold value for the moving body determination.

However, in order to improve the trackability of the focusing operation, it is necessary to immediately shift to moving body tracking control when the true subject has started to move from the stationary condition. To perform shifting to the moving body tracking control when the subject starts to move from a stationary position, it is necessary for the moving body determination threshold value to be set to as low a value as possible.

The problem remaining in the conventional moving body determination is that the threshold values of the speeds which must be set according to the above-described two factors do not correspond, and actually, the threshold value can only be set to an appropriate balance point. However, the problems of mis-detection of the moving body and delayed focus tracking will both gradually come about.

SUMMARY OF THE INVENTION

It is an object of the present invention to provide an autofocus device, suitable for use in a camera, which performs moving body tracking control with a high level of accuracy.

Objects and advantages of the present invention are attained with an autofocus control device, including a defocus amount computation device to compute a defocus amount based on the luminous flux passing through a lens which contains subject information, a drive position computation device to compute information relating to the position to which the lens is to be driven based on the computed defocus amount, a first drive direction computation device to compute the direction in which the lens is to be driven based on first information including a specified amount of past position information, a field travel speed computation device to compute the field travel speed according to second information including an amount of position information smaller than the specified amount of past information, a second drive direction computation device to compute the direction in which the lens is to be driven according to the position information used by the field travel speed computation device, and a moving body determination device to determine whether the object is a moving body based on the output of the first drive direction computation device, the field travel speed computation device, and the second drive direction computation device.

The moving body determination device in accordance with embodiments of the present invention determines that the object is a moving body when the field travel speed from the field travel speed computation device is not less than a specified value and when the directions of travel from the first drive direction computation device and the second drive direction computation device match.

In accordance with embodiments of the present invention, a determination is made as to whether the object is a moving body based on the output of the first drive direction computation device, the field travel speed computation device, and the second drive direction computation device, so an accurate moving body determination can be made.

Further, in accordance with embodiments of the present invention, when the field travel speed from the field travel speed computation device is not less than a specified value and the directions of travel from the first drive direction computation device and the second drive direction computation device match, the object is judged to be a moving body, so mis-detection of the moving body resulting from detection system error can be eliminated. Also, tracking performance can be improved.

DESCRIPTION OF THE PREFERRED EMBODIMENTS

Figure 1:
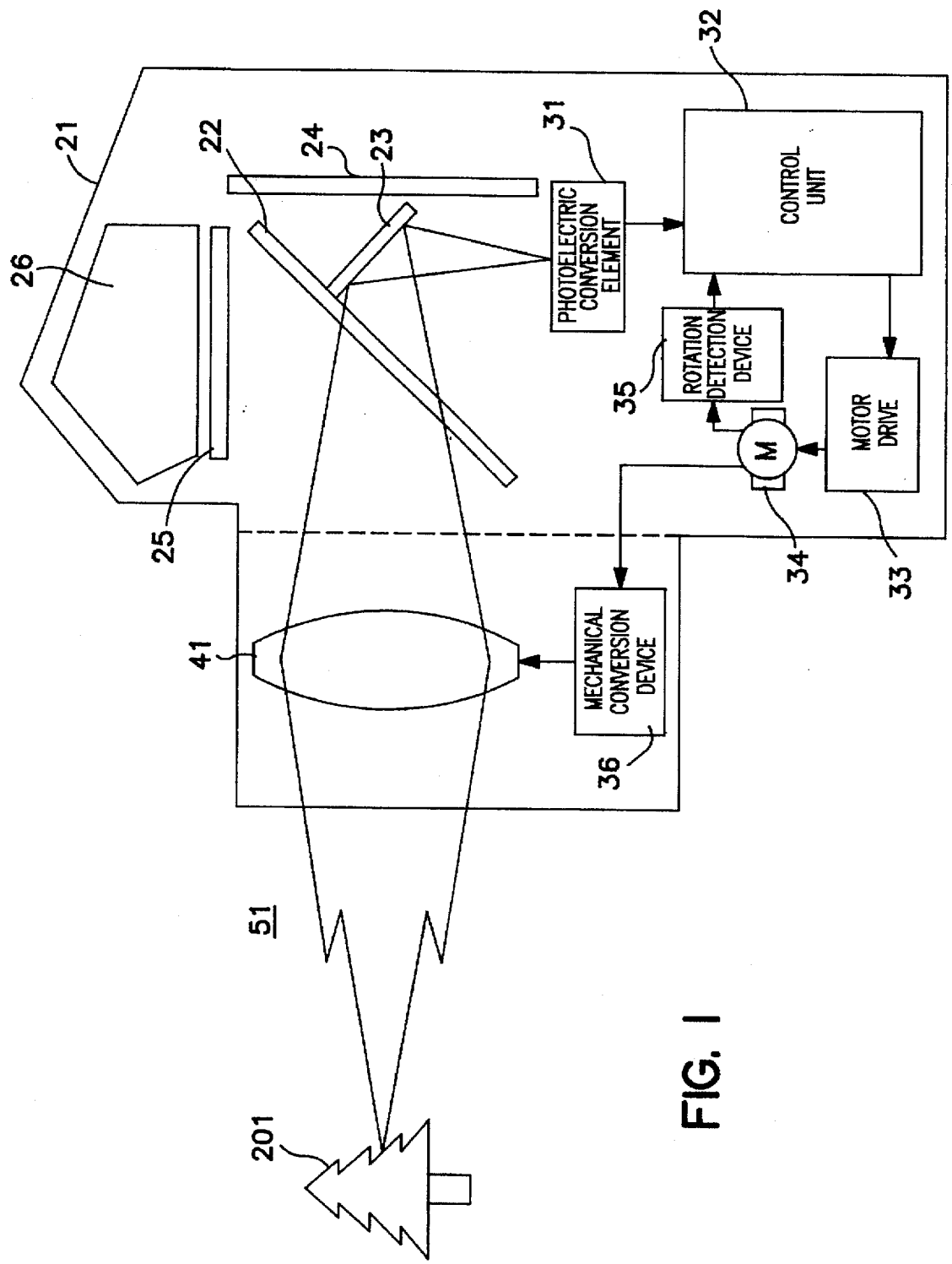
FIG. 1 is a block diagram showing a side view of a camera in accordance with embodiments of the present invention.

Reference will now be made in detail to the present preferred embodiments of the present invention, examples of which are illustrated in the accompanying drawings, wherein like reference numerals refer to like elements throughout.

FIG. 1 is a block diagram showing a side view of a camera 21 in accordance embodiments of the present invention. As shown in FIG. 1, a photographic lens 41 of the camera 21 receives luminous flux 51 from a subject 201 which passes through the photographic lens 41 and is incident upon a film plane 24. A semi-transparent main mirror 22 located inside the body of the camera 21 reflects the subject luminous flux upward during photographic preparatory operations to resolve the subject image on a viewfinder screen 25, such that the photographer is able to visually check the subject image via a pentagonal prism 26. Part of the luminous flux which passes through the main mirror 22 is guided downward by a totally reflecting sub-mirror 23 and enters a photoelectric conversion element 31. The main mirror 22 and the sub-mirror 23 spring upward toward the viewfinder screen 25 during exposure, allowing all of the luminous flux from the photographic lens 41 to reach the film plane 24 (image forming plane).

A control unit 32, which includes a microcomputer, controls all of the circuit components described in connection with embodiments of the present invention. An A/D converter, a memory and a timer clock are built into the control unit 32. The photoelectric conversion element 31, which is preferably a CCD, is driven by the control unit 32, and outputs to the control unit 32 analog image signals corresponding to the luminous flux guided by the sub-mirror 23 to the photoelectric conversion element 31.

A motor drive 33 drives a motor 34 in accordance with signals received from the control unit 32 to shift the photographic lens 41. The rotation of the motor 34 is partly converted into movement of the photographic lens 41 in an optical axis direction by a mechanical converter 36. As the motor 34 rotates, the motor's speed is detected by a rotation detector 35 and input to the control unit 32 which controls the movement of the photographic lens 41 to control the formation of an image on the image forming plane 24.

Figure 2:
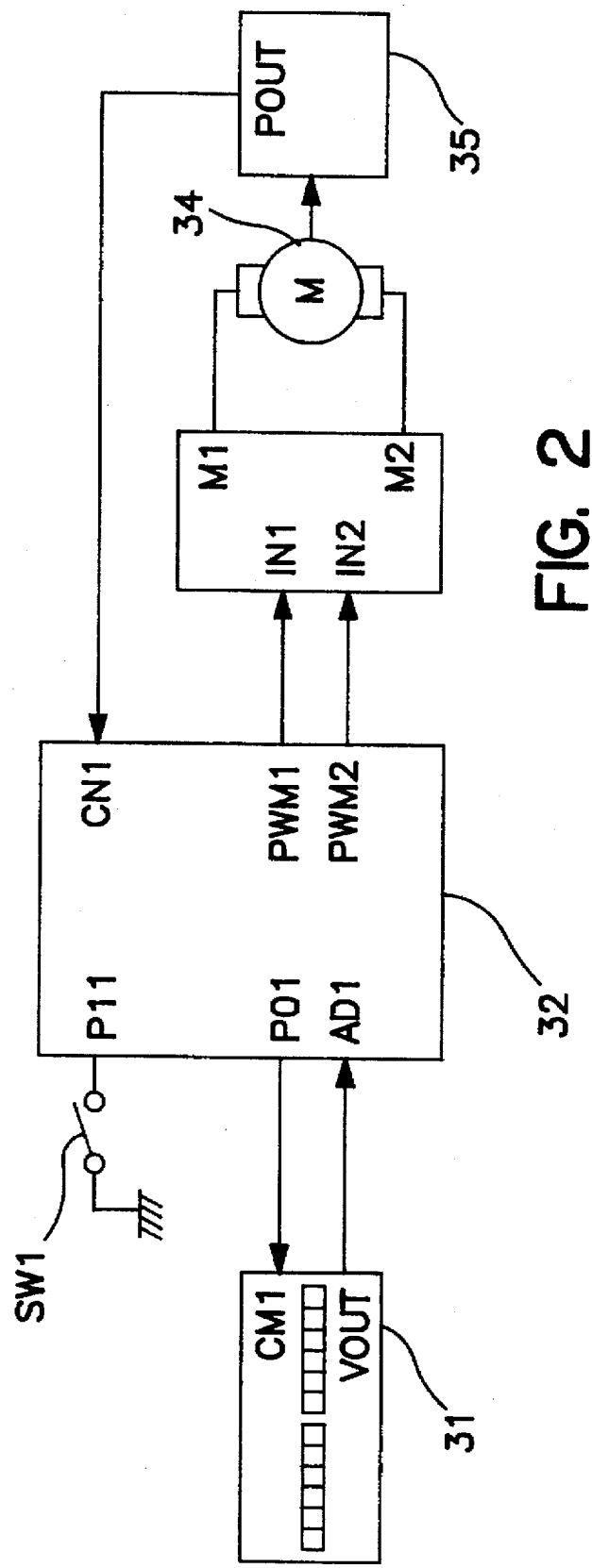
FIG. 2 is a block diagram showing control circuits for controlling autofocus in accordance with embodiments of the present invention.

FIG. 2 is a block diagram showing in detail the connections between the photoelectric conversion element 31, the control unit 32, the motor drive 33, the motor 34, and the rotation detector 35, shown in FIG. 1. Communication between each of the above-noted components will now be explained with reference FIG. 2.

The photoelectric conversion element 31 includes an input terminal CM1 and an output terminal VOUT. The motor drive 33 includes two input terminals, IN1 and IN2, and two output terminals M1 and M2. The rotation detector 35 includes an output terminal POUT. The control unit 32 includes six terminals: output port P01, A/D conversion input terminal AD1, pulse width modulation ("PWM") output port PWM1, PWM output port PWM2, counter input port CN1, and input port P11. The six terminals of the control unit 32 are electrically connected with the terminals of other circuit components, and communication with the other circuit components is performed via the six terminals.

The control unit 32 outputs control signals from the output port P01 to the input terminal CM1 of the photoelectric conversion element 31. The photoelectric conversion element 31 is driven based on the control signals from output port P01, and outputs image signals from the output terminal VOUT which are input to the A/D conversion input terminal AD1 of the control unit 32.

Further, the control unit 32 outputs from output ports PWM1 and PWM2 two-bit pattern signals, HL, LH, HH and LL, which control the rotation mode of the motor 34. The motor drive 33 receives the two-bit pattern signals at input terminals IN1 and IN2, and drives the motor 34, which is connected to output terminals M1 and M2, according to the two-bit pattern signals, HL, LH, HH and LL. The motor 34 operates in a normal rotation mode when the pattern HL is input to terminals IN1 and IN2, a reverse rotation mode when the pattern LH is input, a short circuit mode when the pattern HH is input, and a release mode when the pattern LL is input.

The motor 34 is connected to the rotation detector 35 by a mechanical linking mechanism (not shown). The rotation detector 35 outputs from output terminal POUT a number of digital pulses which is proportional to the angular velocity of the motor 34. The digital pulses output from the terminal POUT enter counter input port CN1 of the control unit 32.

SW1 is a switch which is switched ON and OFF in conjunction with an operation by the photographer, for example, the pushing of a release button (not shown). The ON/OFF signal associated with switch SW1 enters input port P11 of the control unit 32.

Figure 6:
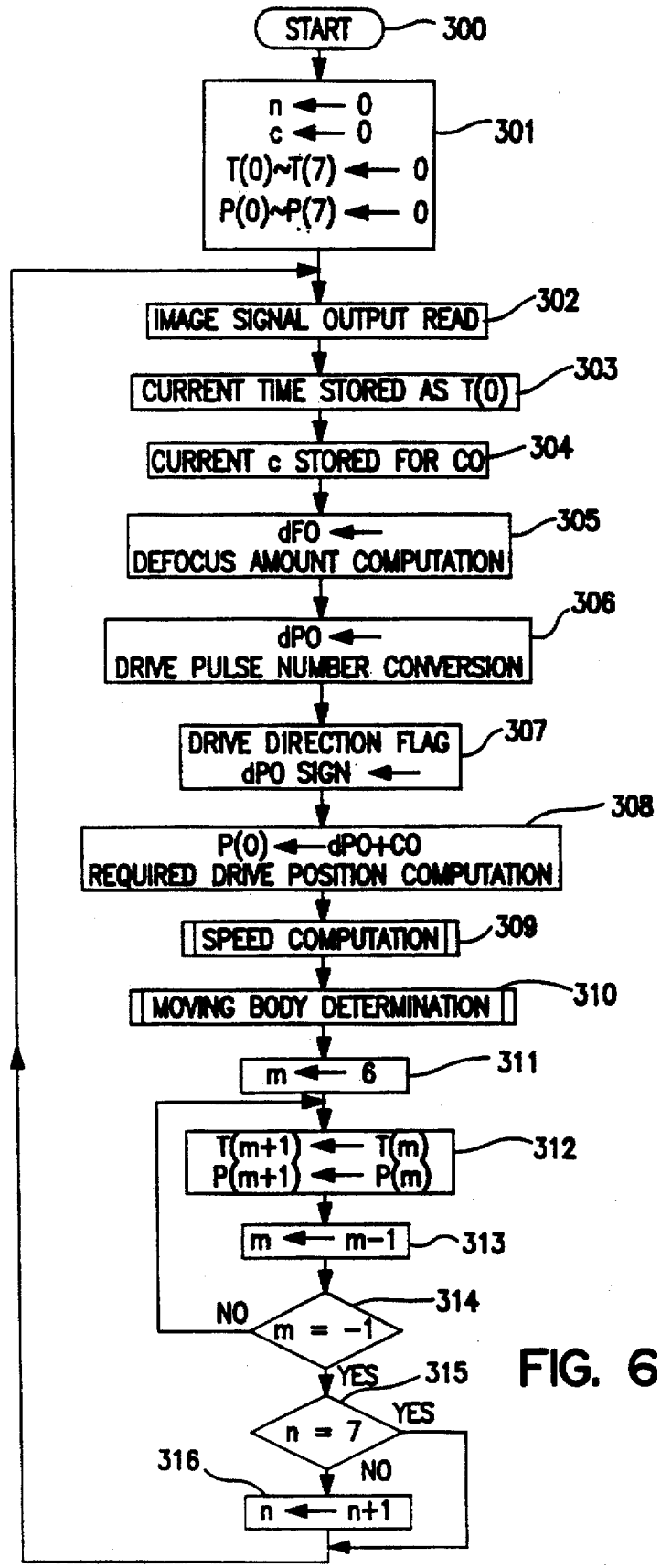
FIG. 6 is a flow chart showing an operational process for performing moving body tracking control in accordance with embodiments of the present invention.
Figure 7:
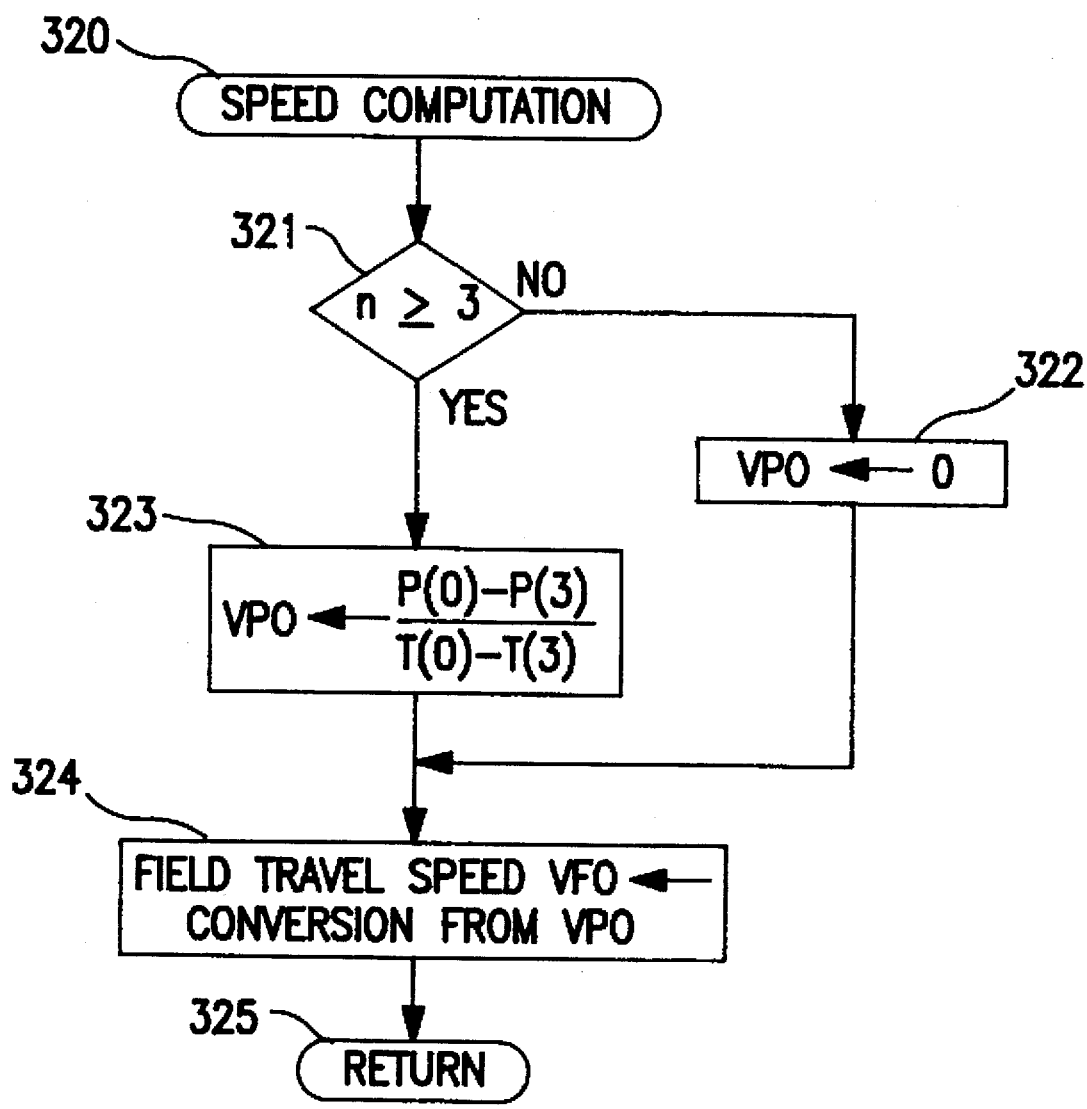
FIG. 7 is a flow chart showing a speed computation operational process in accordance with embodiments of the present invention.
Figure 8:
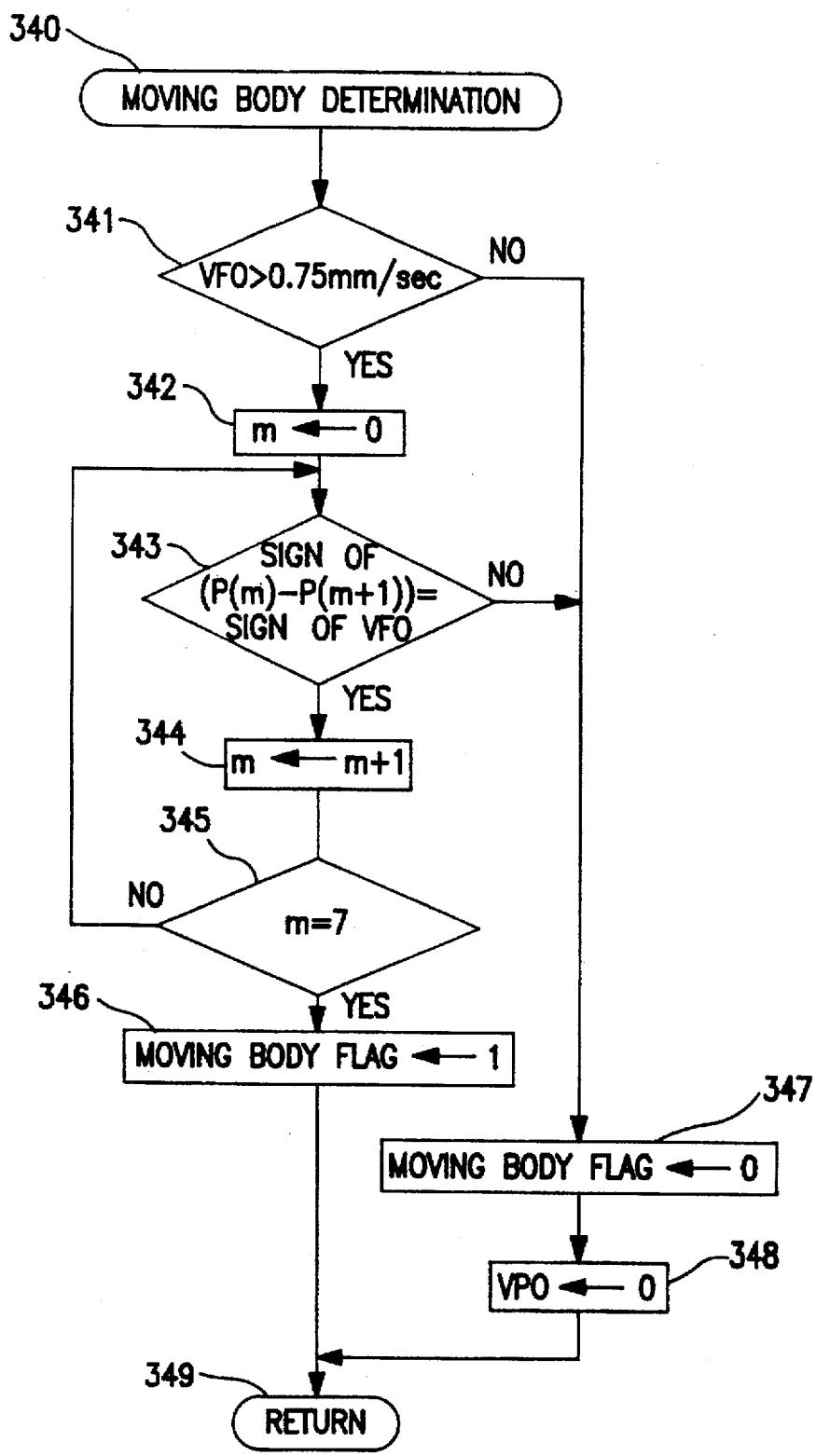
FIG. 8 is a flow chart showing a moving body determination operational process in accordance with embodiments of the present invention.
Figure 9:
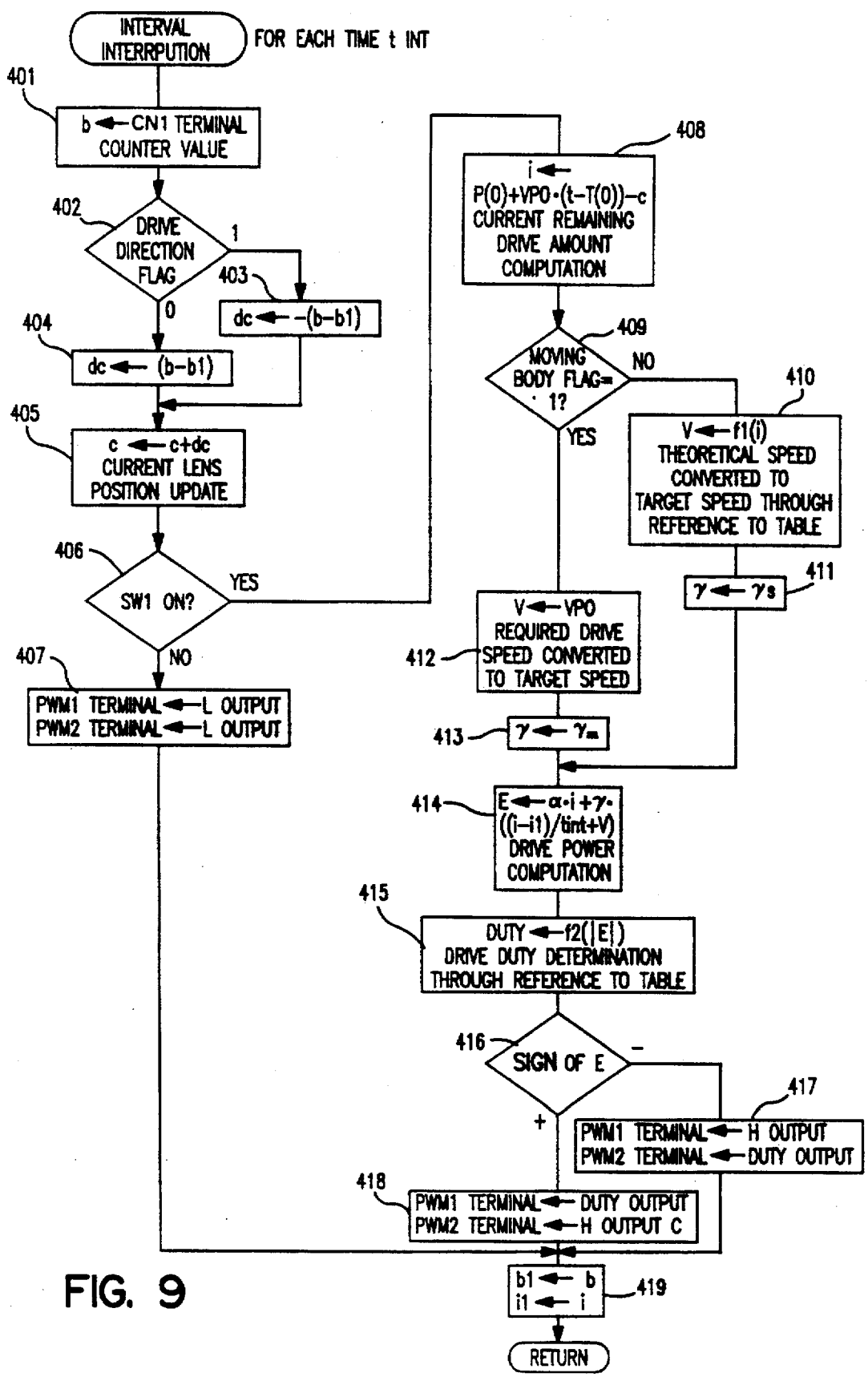
FIG. 9 is a flow chart showing an interval interruption operational process in accordance with embodiments of the present invention.

Operation of the camera in accordance with embodiments of the present invention will now be described with reference to FIGS. 6 through 9 which are flow charts showing operational processes for performing autofocus control with moving body tracking control. FIG. 6 is a flow chart showing a main operational process; FIGS. 7 and 8 are flow charts showing a speed computation operational process and a moving body determination operational process, respectively, which are performed during the main operational process; and FIG. 9 is an interval interruption operational process which is executed every 1 msec.

Referring now to FIG. 6, the main operational process is started (step 300) when power is supplied to the camera circuitry from a power source (not shown). In step 301, an initialization operation is performed and variables N and C, and array variables T(0) through T(7) and P(0) through P(7) are cleared to zero (0). The variable n indicates the number of times the main operational process is repeated; c is the current lens position; the array variables P(0) through P(7) indicate the required drive positions generated at times T(0) through T(7), respectively. Next, in step 302, the photoelectric conversion element 31 receives a command to output image signals. The image signals output from the photoelectric conversion element 31 enter A/D conversion input terminal AD1 of control unit 32, undergo A/D conversion, and are stored in the memory of the control unit 32.

Continuing, in step 303, the current time from the clock inside the control unit 32 is stored in the memory as variable T(0). In step 304, the current variable c is stored as the lens position C0 at the point when the image signals are received from the photoelectric conversion element 31. Steps 302 through 304 are shown as sequential steps, but are actually performed at the same time. Proceeding to step 305, a defocus amount dF0, which is an amount of dislocation of the image forming plane (film plane) and the subject image position in the optical axis direction, is computed according to a well-know method, such as a phase difference method, or the like, based on the image signals received from the photoelectric conversion element 31.

In step 306, the defocus amount dF0 obtained in step 305 is converted, according to a conversion coefficient particular to the photographic lens, into a number of pulses dP0 which matches a value corresponding to the output of the rotation detection device 34.

The sign of the defocus amount dF0 is then stored (step 307) as a drive direction flag, with positive being zero (0) and negative being one (1). Next, the required drive position P(0) is computed (step 308) by adding the number of pulses dP0 computed in step 306 to the lens position C0 stored in step 304.

A speed computation operational process is then performed (step 309). The speed computation operational process will now be described below with reference to the flow chart of FIG. 7.

The speed computation operational process begins in step 320, and in step 321, a check is made to determine whether the variable n, which indicates the number of times the main operational process of FIG. 6 has been executed, is three (3) or more. If the variable n is less than three (3), the speed computation operational process proceeds to step 322; if the variable n is three (3) or more, the operational process proceeds to step 323.

In step 322, a required drive speed of the lens VP0 in number of pulses per second is set to zero (0). In step 323, the required drive speed VP0 is obtained by Equation (1) below.

$$VP0=(P(0)-P(3))/(T(0)-T(3)) \quad (1)$$

In Equation (1), P(0) and P(3) are, respectively, the most recent required drive position and the required drive position generated three times previous to the most recent required drive position. T(0) and T(3) are, respectively, the time when the image signals were most recently received and the time when image signals were received three times previous to the most recently received image signals. It is noted that the required drive speed of the lens VP0 is computed from the difference between the most recent required drive position and the required drive position generated three times previous to the most recent required drive position only in the case where the required drive position data generated three times previous exists.

Next, in step 324, the particular conversion coefficient of the photographic lens is again used to convert the required drive speed VP0 of the lens in number of pulses per second into a field travel speed VF0 in units of millimeters per second. The operational process then returns (step 325) to the main operational process of FIG. 6.

After returning to the main operational process in FIG. 6, a moving body determination operational process is performed (step 310). The moving body determination operational process will now be described with reference to FIG. 8.

The moving body determination operational process begins in step 340. In step 341, the field travel speed VF0 obtained during the previous speed computation operational process is compared with a fixed threshold value, e.g., 0.75 mm/sec. If the field travel speed VF0 is smaller than the fixed threshold value, the subject is judged not to be a moving body, and the operational process proceeds to step 347 where a moving body flag is set to zero (0). If the field travel speed VF0 is larger than the fixed threshold value, there is still a possibility that the subject is a moving body, and the operational process proceeds to step 342. In step 342, a variable m is set to zero (0).

Next in step 343, using the array variables P(0) through P(7), which represent the history of the required drive position from the most recent required drive position back through the required drive position generated seven (7) times previously, a determination is made as to whether the sign of (P(m)−P(m+1)) matches the sign of the field travel speed VFO. (P(m)−P(m+1)) is the difference between the value P(m), indicated by the independent variable m, and value P(m+1) which was generated one time previous to P(m). If the signs of (P(m)−P(m)+1)) and VFO do not match, the subject is judged not to be a moving body, and the operational process proceeds to step 347 where the moving body flag is set to zero (0).

When the signs match, the operational process proceeds to step 344 where the variable m is incremented by one (1). A check is then performed to determine whether m has reached seven (7) (step 345). When m is not seven (7), step 343 is again performed and m is incremented by one (1) in step 344. When m=7 in step 345, the operational process proceeds to step 346. In step 346, the moving body flag is set to one (1) indicating that the subject is a moving body, and the operational process returns (step 349) to the main operational process in FIG. 6.

In the loop of steps 342 to 345, a determination is made for each required drive position, from the most recent required drive position through the required drive position generated seven times previously, whether the direction of the change in the required drive position between two successive generations of required drive position matches the direction of the field travel speed computed most recently. If there has been a change in the direction of the required drive position opposite to that of the direction of field travel speed, even one time, a determination is rendered that the subject can not be considered a moving body.

Figure 11:
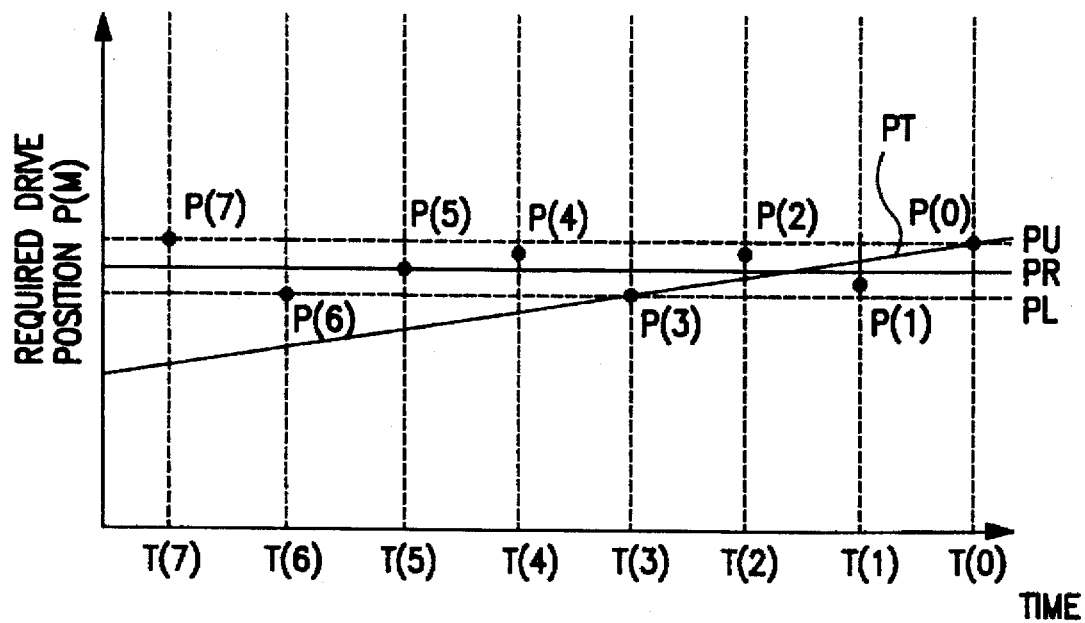
FIG. 11 is a graph showing required drive position versus time for a conventional moving body tracking control system.

For example, as shown in FIG. 11, even if the field travel speed computed based on the difference between P(0) and P(3) exceeds the specified threshold value, the sign (P(1)−P(2)) is opposite of the sign of the field travel speed, and the subject is judged not to be a moving body.

Figure 10:
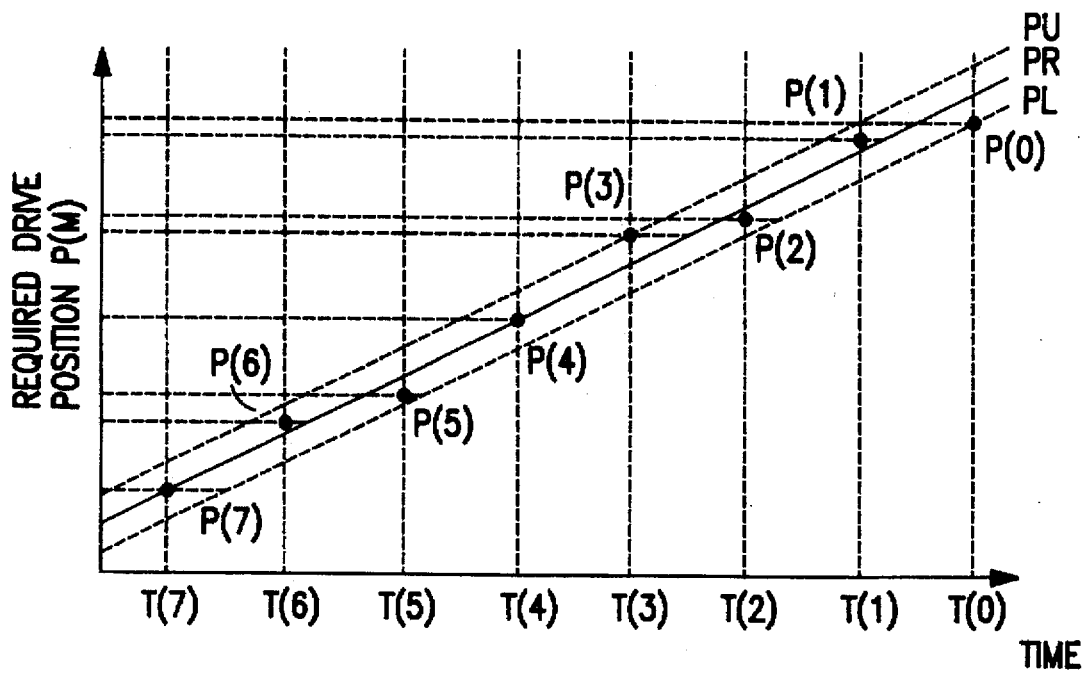
FIG. 10 is a graph showing required drive position versus time in accordance with embodiments of the present invention.

FIG. 10 shows another example of subject movement on the same horizontal axis and vertical axis as shown in FIG. 11. The movement of the lens to the required drive position to match the true movement of the subject is shown by the straight line PR. Further, the range of the dispersion which results from error in the detection system for the computed required drive position of the lens is shown by an upper limit PU and a lower limit PL. In the example shown in FIG. 10, the required drive position at each time T(7) through T(0) is dispersed within the range between the upper limit PU and the lower limit PL; however, the respective heights of P(0) through P(7) are all aligned in the order of the independent variable m, and the signs of the differences between adjacent values of P(m) all match the sign of the field travel speed computed between P(0) and P(3). In accordance with embodiments of the present invention, the subject is judged to be a moving body in a case such as that shown in FIG. 10.

In step 341 of FIG. 8, when the field travel speed VF0 is not more than the predetermined threshold value (0.75 mm/sec) or when there has been a sign mismatch in step 343, the moving body flag is cleared by setting the moving body flag to zero (0) (step 347). In step 348, the required drive speed VP0 is changed to zero (0), and the operational process returns to step 311 of the main operational process in FIG. 6.

In step 311, the variable m is set to six (6), and a loop from step 312 to step 314 is entered. In step 312, the variable T(m) is copied to T(m+1), and the variable P(m) is copied to the variable P(m+1). Next, in step 313, the variable m is decremented by one (1) and, in step 314, it is determined whether m=−1. The loop of steps 312 through 314 is performed until m=−1. The loop of steps 312 through 314 updates the history of times T(m) and required drive positions P(m) by shifting the times T(m) at which the image signals were received and the required drive positions P(m) of the lens computed during a particular cycle to a storage area corresponding to one generation previous. Accordingly, the history of the times T(m) and the required drive positions P(m) from the most recent to the eighth generation are continually updated for each processing cycle of the main operational process.

Next, in step 315, it is determined whether the variable n has reached seven (7). If the variable n is less than seven (7), the operational process proceeds to step 316 where n is incremented by one (1) and the operational process returns to step 302. If the variable n has reached seven (7), the operational process returns to step 302, the beginning of the loop of steps 302 to 316.

The control unit 32 repeatedly executes the main operational process shown in the flow chart of FIG. 6. The control unit 32 also processes an interval interruption operational process shown in the flow chart of FIG. 9 every one millisecond. The interval interruption operational process will now be explained below with reference to FIG. 9.

In step 401, a count value obtained from counting a number of pulses input to counter input port CN1 is stored as a variable b. Next, in step 402, it is determined whether the drive direction flag is one (1) or zero (0). When the drive direction flag is zero (0), the operational process proceeds to step 404, and when the drive direction flag is one (1), the operational process proceeds to step 403. In step 403, the negative drive direction flag is appended to the difference of the count value b and a count value b1 for a previous iteration of the interval interruption operational process to produce a value dc=−(b−b1) which is stored as operation variable dc. In step 404, the positive drive direct in flag is appended to (b−b1), and the result is stored as operation variable dc.

Then, in step 405, a value obtained by adding the operation variable dc to c, the current lens position in real time, is stored as the new lens position c. The operational process steps 402 through 405 add up the pulses which accompany lens movement from the counter input port CN1 without being distinguished by drive direction, while discriminating between the drive directions according to the drive direction flag. Next, in step 406 the state of the switch SW1 is sensed at input port P11. When the switch SW1 is OFF, the operational process proceeds to step 407, and when the switch SW1 is ON, the operational process proceeds to step 408. Switch SW1 is turned ON through an operation by the photographer when he or she wishes to perform an autofocus operation, otherwise the switch SW1 is OFF.

When switch SW1 is OFF, and no autofocus operation is performed, in step 407, an L level signal is output from both PWM output ports, PWM1 and PWM2, and the motor drive circuit 33 receives a command to release the motor. After step 407, since autofocusing is not to be put into effect and power is not supplied to the motor, the operational process continues in step 419 where the counter value b and a remaining drive amount i during the iteration just performed are stored as variables b1 and i1, respectively. The interval interruption operational process then returns. In step 408, when the switch SW1 is ON, lens drive control for autofocusing is started by first computing the current real time remaining drive amount i according to Equation (2) below.

$$i = P(0) + VP0 \cdot (t - T(0)) - c \qquad (2)$$

In Equation (2), t is the current time, and the current remaining drive amount i is considered to be the difference between the target lens position at the current instant, to which the target movement portion from the point at which the image was received by the photoelectric conversion element has been added, and the current actual lens position c.

Next, in step 409, it is determined whether the moving body flag is one (1) or zero (0). In the moving body determination operational process shown in FIG. 8, the moving body flag has already been set when the target drive speed VFO is greater than a predetermined threshold value. When the moving body flag is zero (0), specifically, when it has been judged that the subject is a non-moving body, the operational process proceeds to step 410.

In step 410, a specified coefficient f1 (i) is entered as a variable V, the target drive speed. The specified coefficient f1 is the theoretical drive speed with respect to the remaining drive amount, and the optimum value of the theoretical drive speed f1 has the property of being determined according to the mechanical characteristics of the autofocus drive system. The specified coefficient f1(i) is retrieved from a ROM table which stores fixed values with the remaining drive amount i as the independent variable.

Figure 5:
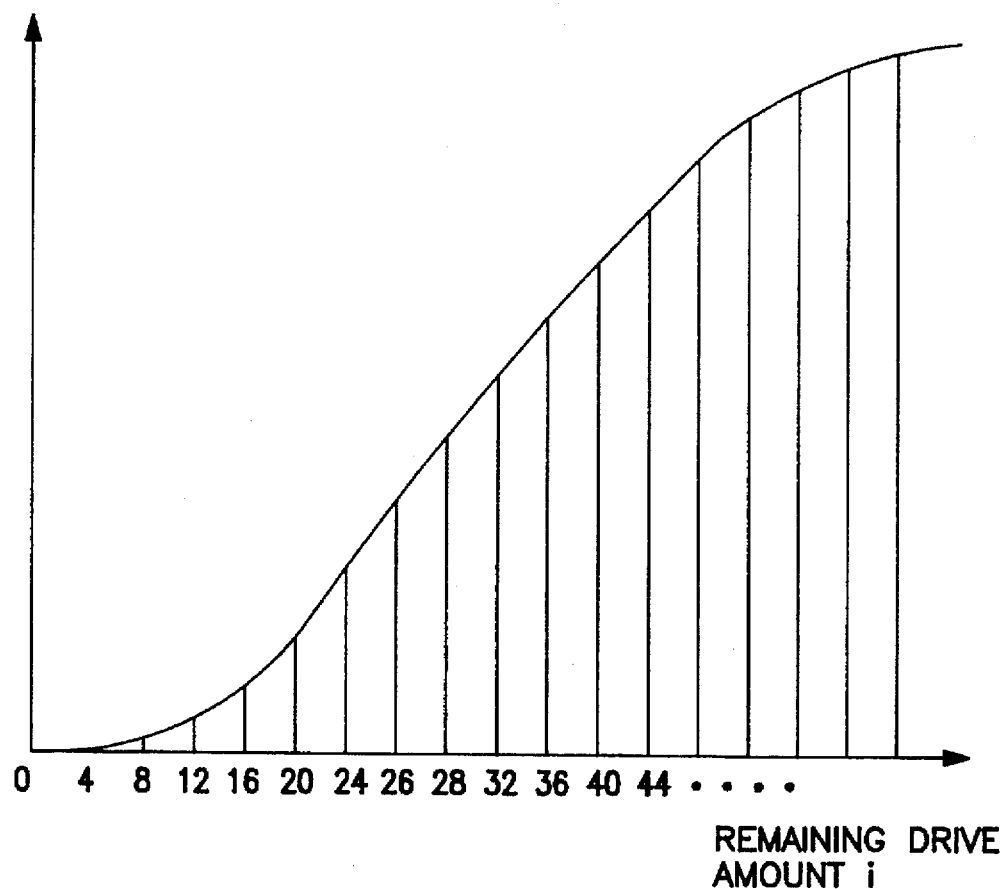
FIG. 5 is a graph showing an example of a remaining drive amount plotted versus theoretical drive speed in accordance with embodiments of the present invention.

FIG. 5 is a graph showing an example of the remaining drive amount i plotted versus the theoretical drive speed f1(i). The remaining drive amount i is plotted on the horizontal axis, and the theoretical speed f1(i) is plotted on the vertical axis. The curve in FIG. 5 shows the theoretical drive speed f1(i) as a function of a remaining drive amount i. The amount of ROM consumed by the information shown in FIG. 5 may be limited by storing one theoretical speed value f1(i) for plural remaining drive amounts i.

When the subject is judged to be a non-moving body in step 409, in step 411, an optimized fixed coefficient ys is entered as a variable y. Alternatively, when the moving body flag is one (1), specifically, when the subject has been judged to be a moving body in step 409, the required drive speed VP0 is entered as the target drive speed V in step 412. Next, in step 413, an optimized fixed coefficient ym is entered as variable y when the subject is a moving body.

When the subject is either a moving body or a non-moving body, the operational process proceeds to step 414 and a motor drive power value E is computed by a computation method common to both a moving and non-moving body, according to Equation (3) below.

$$E = a \cdot i + y \cdot ((i - i1)/t \, int + V) \qquad (3)$$

In Equation (3), tint is an interval time, entered by the interval processing, which is preferably 1 msec. The variable i1 results from storing the value of the remaining drive amount i during the previous iteration of the interval interruption operational process. Therefore, (i−i1)/t int is equivalent to di/dt, which is the rate of change of the remaining drive amount i with respect to time.

Next, in step 415, the drive duty value DUTY of the lens drive motor is determined by referring to a specified coefficient f2(|E|), which is stored in the ROM table. The coefficient f2(|E|) is found in the ROM table by referring to the absolute value of E, which is a signed variable. The coefficient f2 is a coefficient for determining the actual effective current to the motor, which corresponds to the absolute value of the desired motor power. The coefficient f2 is a coefficient which tends to be roughly proportional to the absolute value of E, but its optimum pattern is specifically determined according to the mechanical characteristics of the autofocus drive system.

Next, in step 416, the direction in which motor power is to be supplied is switched according to the sign of the motor power value E. Specifically, when E is a negative value, the operational process proceeds to step 417. Conversely, when E is a positive value, the operational process proceeds to step 418. In step 417, normal output of the H level from PWM output port PWM1 is performed, and the PWM waveform of the DUTY determined in step 415 is output from PWM output port PWM2. In step 418, normal output of the H level from PWM output port PWM2 is performed, and the PWM waveform of the DUTY determined in step 415 is output from PWM output port PWM1. Through the above-described operations, the effective current, which is applied to the motor continuously, can be controlled across the entire positive and negative range of the desired power value.

Lastly, in step 419, as common processing for all cases, the counter value b and remaining drive amount i generated during the current iteration of the interval interruption operational process are respectively stored as variables b1 and i1, and the interval interruption operational process returns.

Figure 3:
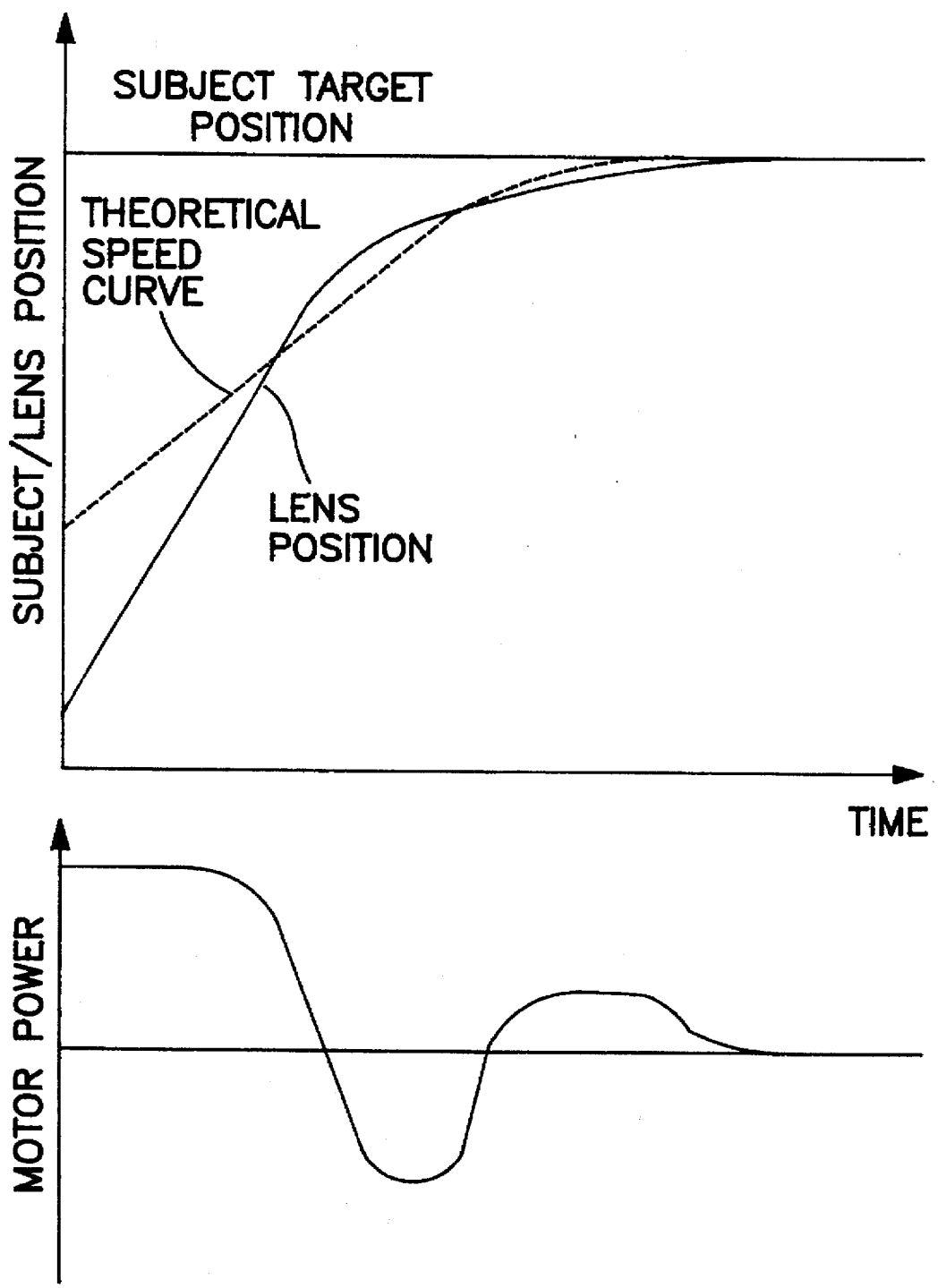
FIG. 3 is a graph showing an example of camera operations in accordance with embodiments of the present invention.
Figure 4:
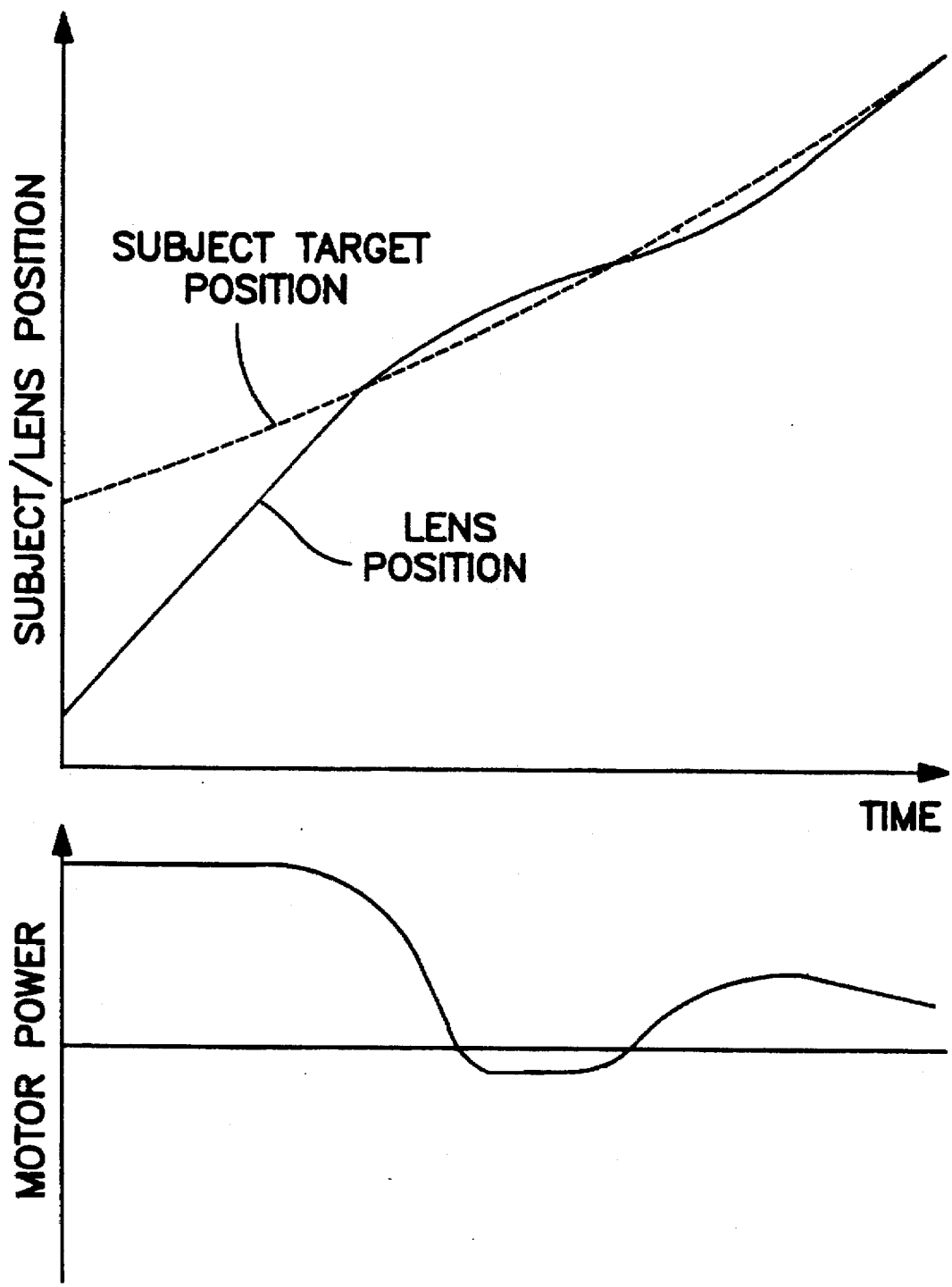
FIG. 4 is a graph showing an example of camera operations in accordance with embodiments of the present invention.

FIGS. 3 and 4 are graphs showing the type of lens movement resulting from lens drive control for autofocusing in accordance with embodiments of the present invention. Both FIGS. 3 and 4 are divided into upper and lower sections which have time on their horizontal axis. The upper section shows the progression of the subject target position and the actual lens position on the vertical axis, and the lower section shows the motor power value on the vertical axis.

FIG. 3 shows a case where it has been judged that the subject is not a moving body. As shown in FIG. 3, the subject target position is a horizontal straight line having no slope. In contrast to the line indicating the subject target position, while the actual lens position is initially greatly separated from the subject target position, the first item in Equation (3), a·i, becomes effective, and control in which 100% motor power is supplied results. Accordingly, while the subject position target is approached at full speed, and when the actual lens travel speed begins to exceed the theoretical speed, y·((i–i1)/t int+V), which is the second item in Equation (3), begins to have relatively greater weight, and motor power is reversed in the deceleration direction. When the actual lens speed begins to be less than the theoretical speed due to the emergency braking effect, as the second item again returns to a value in the positive direction, the effectiveness of the first item is restored, and motor power gradually returns to rotation in the acceleration direction. The above feedback is actually repeated in detail over a shorter time span, and the target position is ultimately smoothly and gradually approached.

In contrast to FIG. 3, FIG. 4 shows the case where the subject has been judged to be a moving body. When the subject target position is assumed to be a straight line rising to the upper right, the target straight line itself is refreshed with each main routine cycle, so it becomes a broken line when observed over a long time span. In contrast to this, when the lens position is initially separated from the subject target position toward the bottom of the graph, the first item in Equation (3) is more effective, and the motor power becomes 100 percent for a certain period of time. When the actual lens position approaches the target straight line to a certain extent over time, the effectiveness of the first item in Equation (3) becomes smaller, and the second item in Equation (3) becomes more important. If the actual lens speed comes to exceed the subject target speed, there is an attempt to reduce motor power, but in the case of a moving body, a feed forward component which is proportional to only to the target speed exists, so even if a braking factor occurs, there are not many cases in which the power is greatly reversed. During that time, even more stable feedback is supplied, and insofar as the target straight line itself does not change, it settles into a condition in which a constant motor power is maintained in one direction. In this case as well, a detailed feedback operation is repeated over a shorter time span.

In accordance with embodiments of the present invention, a subject is judged to be a moving body only when the most recent computed field travel speed exceeds a specified threshold value (Condition 1), and the direction of change of the drive target positions over multiple past specified generations matches the direction which indicates the computed field travel speed (Condition 2). In comparison with the conventional case in which the moving body determination was made taking only Condition 1 into account, mis-detection of the moving body resulting from detection system error can be eliminated through Condition 2 even if the threshold value of the field travel speed is set to a level which is lower than that of the conventional case. By lowering of the threshold value, focusing tracking performance when the subject begins to move from a stationary condition can be improved.

In the above-described manner, the determination of whether the object is a moving body is based on the output of the first drive direction computation device, the field travel speed computation device, and the second drive direction computation device, so the moving body determination can be made accurately, and accurate autofocusing can be performed.

Also, in accordance with embodiments of the present invention, the object is judged to be a moving body when the field travel speed is not less than a specified value and when the directions obtained from the first drive direction computation device and the second drive direction computation device match, so mis-detection of a moving body resulting from detection system error can be eliminated. Moreover, while tracking capability can be improved, and high tracking ability for focusing on subjects which begin to move from a stationary condition can be ensured, moving body determination errors which arise from error factors in the detection system can be held to a minimum, and it is possible to perform focusing with a high degree of stability.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An autofocus control device to control focusing of a photographic lens on a subject, comprising:
   a defocus amount computation device to periodically determine a defocus amount of a subject image;
   a drive position computation device to compute drive target positions to which the photographic lens is to be driven corresponding to each periodically determined defocus amount;
   a first direction computation device to determine respective changes in direction of drive target position between successive computed drive target positions;
   a field travel speed computation device to compute a field travel speed for the subject based on drive target positions computed by the drive position computation device;
   a second direction computation device to determine a direction of the computed field travel speed; and
   a moving body determination device to determine whether the subject is a moving body based on the directions determined by the first direction computation device, the field travel speed determined by the field travel speed computation device, and the direction determined by the second direction computation device.

2. An autofocus control device as recited in claim 1, wherein the moving body determination device determines that the subject is a moving body when the field travel speed is greater than a predetermined value and when the respective directions determined by the first direction computation device and the second direction computation device are the same.

3. An autofocus control device as recited in claim 2, wherein the first direction computation device determines a direction of change of the successive drive target positions for a predetermined number of drive target positions.

4. An autofocus control device as recited in claim 3, wherein the second direction computation device determines a direction of the field travel speed based on a number of drive target positions less than the predetermined number.

5. An autofocus control device as recited in claim 4, wherein the second direction computation device determines a direction of the field travel speed based on the most recent drive target position computed by the drive position computation device.

6. An autofocus control device as recited in claim 5, wherein the field travel speed computation device computes the field travel speed based on the most recent lens drive position computed by the drive position computation device and previous position information computed by the drive position computation device.

7. An autofocus control device as recited in claim 4, wherein the first direction computation device determines a direction of change of successive drive target positions based on the difference between consecutive drive target positions for each of a most recent computed drive target position and seven successive drive target positions computed by the drive position computation device prior to the most recent drive target position, and the second direction computation device computes the direction of the field travel speed based on the most recent drive target position computed by the drive position computation device and a drive target position computed three times previous to the most recent computed drive target position.

8. A autofocus control device as recited in claim 1, further comprising:
an exposure device to perform exposure to record the image of the subject onto an image forming plane,
wherein the defocus amount is an amount of deviation in the optical axis direction of an image formed by the photographic lens and the image forming plane.

9. An autofocus control device as recited in claim 1, further comprising a lens drive control to drive the photographic lens according to the computed field travel speed when the moving body determination device determines that the subject is a moving body.

10. An autofocus control device for photographic device which forms an image of a subject on an image forming plane with a photographic lens, comprising:
a drive to drive the photographic lens in an optical axis direction;
a photoelectric conversion element to receive the image of the subject and to convert the image into electrical signals;
a defocus amount computation device to compute a defocus amount, representing an amount of deviation of an image position formed by the photographic lens from the image forming plane, based on the output of the photoelectric conversion element;
a drive position computation device to compute a position to which the photographic lens is to be driven for focusing based on the output of the defocus amount computation device;
a drive position history storage device to store a history of drive position data for a predetermined number of computations of positions to which the photographic lens is to be driven;
a field travel speed computation device to compute the subject field travel speed and direction from the difference between the most recent computation of the drive position and a computation of the drive position performed a predetermined number of computations prior to the most recent computation;
a moving body determination device to determine whether the subject is a moving body; and
a lens drive control to drive the photographic lens according to the result of the moving body determination device, wherein the moving body determination device determines that the subject is a moving body when the subject field travel speed obtained by the field travel speed computation device is not less than a predetermined value, and a change in direction of drive position between each respective drive position stored in the drive position history storage device and a drive position generated one time previous all match the direction of the subject field travel speed.

11. An autofocus control device to control focusing of an image of a subject on an image forming plane by a photographic lens, comprising:
a defocus amount computation device to determine a defocus amount representing a deviation of a position of an image formed by the photographic lens from the image forming plane;
a drive position computation device to compute a series of drive positions to which the photographic lens is to be driven based on the output of the defocus amount computation device and to store a history of the computed drive positions;
a moving body determination device m determine whether the subject is a moving body based on the history of required drive positions by determining whether a change in direction of drive position between each successive computed drive position is the same; and
a lens control to drive the photographic lens according to the drive speed computed by the drive speed computation device when the moving body determination device determines that the subject is a moving body.

12. An autofocus control device as recited in claim 11, further comprising:
a field travel speed computation device to compute the subject field travel speed and direction based on a drive position computed most recently and a drive position computed a predetermined number of times prior to the drive position computed most recently,
wherein the moving body determination device determines that the subject is a moving body when the computed field travel speed exceeds a predetermined value, and the direction of the change in between each successive computed drive position is the same as the direction of the field travel speed.

13. An autofocus control device as recited in claim 12, wherein the field travel speed computation device determines a field travel speed of the subject from the difference between the most recent computed drive position and a drive position computed three times previous to the most recent drive position.

14. An autofocus control device as recited in claim 12, wherein the drive position computation device stores a history of eight consecutive drive positions from a most recent drive position to a seventh previous drive position.

15. An autofocus control device as recited in claim 12, wherein the predetermined value is 0.75 millimeters per second.

16. An autofocus system for a camera having a photographic lens to focus on a subject, comprising:
a defocus amount computation device to destining a defocus amount of a subject image representing a deviation of a position of an image formed by the photographic lens from an image forming plane;
a drive position computation device to compute a series of drive target positions of the photographic lens based on the defocus mount determined by the defocus amount computation device and to store a history of the computed drive target positions; and a moving body tracking control system to determine a field travel direction for the subject and change in direction between successive drive target positions of the series of drive target positions based on the stored history of computed drive target positions and to determine that the subject is a moving body when the field travel direction is the same as the directions of change of the series of drive target positions.

* * * * *

UNITED STATES PATENT AND TRADEMARK OFFICE
CERTIFICATE OF CORRECTION

PATENT NO. : 5,692,118
DATED : November 25, 1997
INVENTOR(S) : Seiichi YASUKAWA

It is certified that error appears in the above-indentified patent and that said Letters Patent is hereby corrected as shown below:

Col. 14, Claim 11, line 22, change "m" to --to--;
Col. 14, Claim 16, line 61, change "destining" to --determine--.

Signed and Sealed this

Seventeenth Day of March, 1998

Attest:

BRUCE LEHMAN

Attesting Officer      Commissioner of Patents and Trademarks